United States Patent

[11] 3,594,877

| [72] | Inventors | Mitsuru Suda;<br>Hiroshi Nagase, both of Fujisawashi, Japan |
|---|---|---|
| [21] | Appl. No. | 869,076 |
| [22] | Filed | Oct. 24, 1969<br>Division of Ser. No. 637,989, May 12, 1967,<br>Pat. No. 3,520,961. |
| [45] | Patented | July 27, 1971 |
| [73] | Assignee | Yuken Kogyo Co., Ltd.<br>Kanagawa-ken, Japan |

[54] APPARATUS FOR MANUFACTURING CERAMIC ARTICLES
2 Claims, 6 Drawing Figs.

[52] U.S. Cl. .................................................. 25/27,
18/DIG. 19, 18/DIG. 44, 249/127
[51] Int. Cl. .................................................. B28b 7/06
[50] Field of Search .......................................... 264/313;
25/27, 29; 18/DIG. 19, DIG. 44; 249/127

[56] References Cited
UNITED STATES PATENTS

| 2,281,133 | 4/1942 | Abercrombie | 18/DIG. 44 |
| 2,289,929 | 7/1942 | Parker | 18/DIG. 44 |
| 2,454,847 | 11/1948 | Slack | 264/311 X |
| 3,089,189 | 5/1963 | Feldman | 18/DIG. 44 |
| 3,141,491 | 7/1964 | Ludewig | 18/36 X |
| 3,173,974 | 3/1965 | Mohr | 264/313 X |
| 3,193,900 | 7/1965 | Wendt | 18/DIG. 44 |
| 3,200,442 | 8/1965 | Haller | 18/DIG. 19 |

FOREIGN PATENTS

| 1,279,428 | 11/1961 | France | DIG. 44/DIG. 44 |

Primary Examiner—J. Spencer Overholser
Assistant Examiner—Ben D. Tobor
Attorney—Steinberg & Blake ABSTRACT: An apparatus for manufacturing ceramic articles, such a tableware. A charge of substantially dry powder is introduced into a mold cavity defined between a substantially rigid mold member and a flexible mold member, and then one of these mold members is urged toward the other to compress the charge in the cavity between the mold members so as to give to the charge a predetermined configuration. Thereafter, the charge is removed from the mold and fired. In this mold, the flexible mold member is in the form of an elastic member capable of resiliently retracting itself from the charge when the molding pressure is released. A restraining means coacts with the flexible elastic mold member to prevent the latter from exerting on the charge any radial forces so that the elastic mold member will move toward and away from the charge but will not have any tendency to rub along the surface of the charge.

INVENTORS
MITSURU SUDA AND
HIROSHI NAGASE
By: Steinberg & Blake
ATTORNEYS

INVENTORS
MITSURU SUDA AND
HIROSHI NAGASE
By: Steinberg & Blake
ATTORNEYS

APPARATUS FOR MANUFACTURING CERAMIC ARTICLES

CROSS-REFERENCE TO RELATED APPLICATION

This application is a division of copending application Ser. No. 637,989, now Pat. No. 3,520,961, filed May 12, 1967 and entitled METHOD AND APPARATUS FOR MANUFACTURING CERAMIC ARTICLES.

BACKGROUND OF THE INVENTION

The present invention relates to an apparatus for manufacturing ceramic articles such as tableware, in the form of cups, saucers, dishes of various sizes and shapes, and the like.

It is conventional at the present time to manufacture ceramic articles of tableware by different known methods and apparatus. Thus, according to one known method, the so-called casting method, a slurry is first prepared by incorporating a relatively large amount of water into a mixture essentially consisting of kaolin, silica, feldspar clay, and about 20 percent of clay to impart to the slurry plasticity and moldability. Then the slurry is poured into a plaster mold. According to another known method a potter's wheel is used to shape the clay into the configuration of desired articles of ceramic tableware.

With these known methods and apparatus it is difficult to achieve articles of uniform quality and also difficulties are encountered during firing of the articles because of the large moisture content thereof. The color of the conventional articles cannot always be controlled as desired because of the relatively large quantity of iron necessarily contained in the materials from which the ceramic articles are made, and in addition with the conventional methods there are unavoidable strains and deformation of the articles occurring during the drying thereof.

SUMMARY OF INVENTION

It is accordingly a primary object of the present invention to provide an apparatus for manufacturing ceramic articles which will avoid the above drawbacks.

In particular, it is an object of the present invention to provide an apparatus capable of eliminating strain and deformation which occurred during drying of an article manufactured according to conventional methods with conventional apparatus.

Also, it is an object of the present invention to provide an apparatus capable of producing high quality ceramic articles which are very uniform in character and which can have the color thereof controlled so that, for example, it is a simple matter with the present invention to achieve articles through which light can pass so as to provide for the articles qualities associated with bone china.

The objects of the present invention also include the provision of an apparatus which will reduce the time required for manufacturing the articles, as compared to the time required for manufacturing conventional articles, and also which will reduce the temperature required during firing of the molded articles.

According to the invention a charge of substantially dry powder is introduced into a mold cavity which is defined between a substantially rigid mold member and a flexible mold member, and then at least one of these mold members is urged toward the other so as to compress the charge between the mold members into a predetermined molded configuration. The substantially rigid mold member may be made of metal while the flexible mold member may be made of rubber or a synthetic resin and is thus elastic so that it will, due to its own inherent resiliency, retract itself away from the compressed, molded article when the molded pressure is released. With the apparatus of the invention a restraining means coacts with the elastic mold member to restrain the latter from exerting radial forces on the molded charge, so that the molded charge is subjected only to compression and will not be subjected to radial forces from the elastic mold member.

With the present invention materials which do not contain clay substances can be satisfactorily worked, so that it is possible to select freely the raw materials which are used to form the substantially dry powder charge, and then irrespective of the composition of the charge, it is possible to readily manufacture tableware simply by the addition of suitable binder material in a suitable amount.

Inasmuch as iron contained in the initial charge will affect the color of the final article, it becomes possible with the present invention to achieve tableware articles of good quality by reducing to a minimum the quantity of iron-containing clay which is included in the charge.

In order to uniformly charge the substantially dry powder into the cavity of the mold, which is defined between the metal mold member and the rubber mold member and which has the configuration of the tableware article which is to be molded, this configuration having a size which takes into consideration shrinkage caused by applying pressure, it is possible to use various features such as centrifugal charging during which the mold members are rotated while the charge is introduced into the cavity therebetween, or an oscillating movement may be imparted to the mold members in order to uniformly charge the cavity. Such oscillation can be electromagnetically provided although high frequency oscillation can also be provided during charging. Furthermore, a combination of centrifugal charging and oscillatory charging can be used to provide exceedingly uniform charging of the mold.

In order to compress the charge between the substantially rigid and the flexible mold members, a mechanical force may be applied to the flexible mold member or a fluid pressure may be applied isostatically, as described in greater detail below.

In order to achieve molded articles having a smooth surface, the flexible rubber mold member is provided with a Shore hardness on the order of about 90°. Thus, when pressure is applied isostatically to the exterior surface of the rubber mold member and to the periphery thereof, there is the possibility of fracturing the molded articles due to the fact that the rubber mold member has a restoring force which becomes particularly effective when the molding pressure is released, and thus it becomes necessary to reduce the tendency of the rubber mold member to act radially on the charge so that the latter is not subjected to any radial forces. This result is brought about by the restraining means of the invention, and for this purpose the thickness of the rubber mold member is varied so that the forces which respectively act on an upper central surface portion and on the periphery of the rubber mold balance each other to eliminate the possibility of radial forces being transmitted to the charge from the rubber mold. It is also possible to embed a rigid core of metal or similar material in the rubber mold member itself, in order to prevent radial shrinkage and expansion of the rubber mold member.

BRIEF DESCRIPTION OF THE DRAWINGS

The apparatus of the present invention is illustrated by way of example in the accompanying drawings which form part of this application and in which.

DESCRIPTION OF PREFERRED EMBODIMENTS

Figure 1:
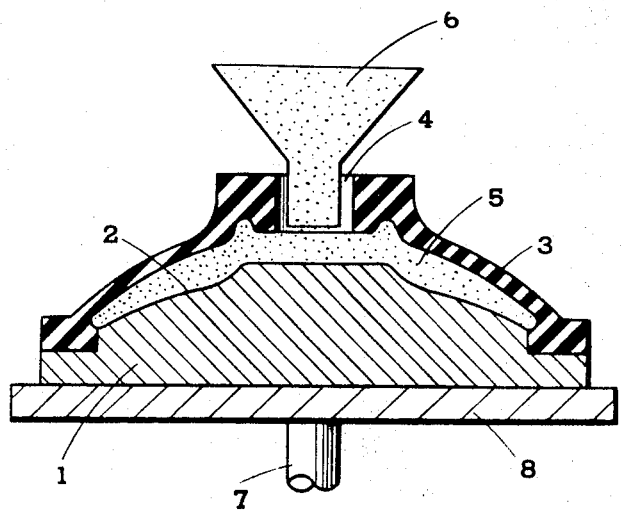
FIG. 1 is a vertical sectional elevation of one possible molding structure according to the invention, part of the structure being shown schematically in FIG. 1, and the apparatus being illustrated in FIG. 1 at a stage during which the mold cavity is charged.

Referring now to FIG. 1, the mold illustrated therein includes a substantially rigid mold member 1 made of metal and a flexible mold member 3 made of rubber. Both of the mold members 1 and 3 extend substantially perpendicularly across the central vertical axis of the mold shown in FIG. 1, and both of these mold members have peripheral portions which surround the central axis of the mold and which engage each other in the manner indicated in FIG. 1. Thus, it will be seen that the flexible mold member 3 terminates at its outer periphery in a downwardly directed substantially flat surface while the rigid mold member 1 has an upwardly directed substantially flat peripheral surface engaging this downwardly directed flat peripheral surface of the member 3, with both of these engaging peripheral surfaces of the mold members being substantially situated in a plane normal to the mold axis. The upper flexible mold member 3 has a downwardly directed surface which defines with the upper surface 2 of the mold member 1 the mold cavity 5 into which the charge is introduced in the manner shown in FIG. 1. For this purpose the upper central portion of the flexible mold member 3 is provided with an opening 4 through which the substantially dry powder charge of the present invention is introduced. The cavity 5 has substantially the same configuration as that of the article which is to be molded, this configuration being defined between the metal mold member 1 and the rubber mold member 3.

In order to completely fill the mold cavity 5 with the charge 6 of substantially dry powder, the mold 1,3 has either a rotary or a vibratory motion imparted thereto. In the example illustrated in FIG. 1 the mold 1,3 is shown mounted on a rotary table 8 situated in a horizontal plane and fixed to a vertical shaft 7 which is rotated about its axis, this axis coinciding with the central mold axis, so that due to this rotary movement the charge is uniformly distributed throughout the mold cavity. However, it is also possible to subject the mold to electromagnetic vibration or to high frequency oscillation, simultaneously with the charging thereof, so that in this way also it is possible to completely and uniformly charge the mold cavity 5.

Figure 2:
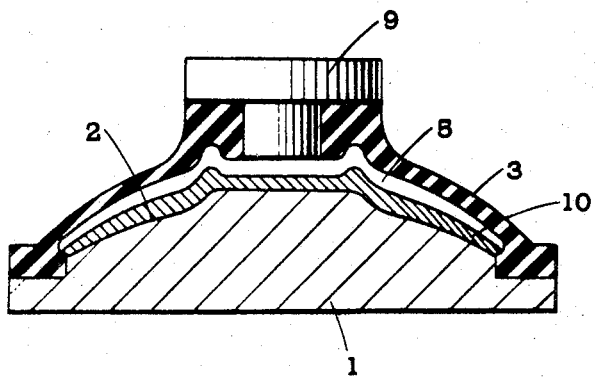
FIG. 2 illustrates the mold of FIG. 1 after the charge has been compressed to the predetermined molded configuration.

After the mold cavity has been fully charged with the substantially dry powder of the invention, described in greater detail below, the vibratory and/or rotary movement imparted to the mold during the charging thereof is terminated, and the charging opening 4 is closed by a rubber plug 9 indicated in FIG. 2. Then the closed mold is removed from the charging table 8, and pressure is applied to the exterior of the mold, more particularly at the exterior surface of the rubber mold member 3, so as to compress the charge in the mold cavity into the configuration of the molded article. After the molding pressure has thus been applied, by an urging means described below which urges one of the mold members toward the other, this pressure is terminated and the rubber mold member 3, due to its own resiliency, is capable of retracting itself to the position shown in FIG. 2, after which the mold members 1 and 3 can be separated and the molded article 2 can then be removed from the mold member 1 and introduced into a suitable firing furnace to be fired.

Figure 3:
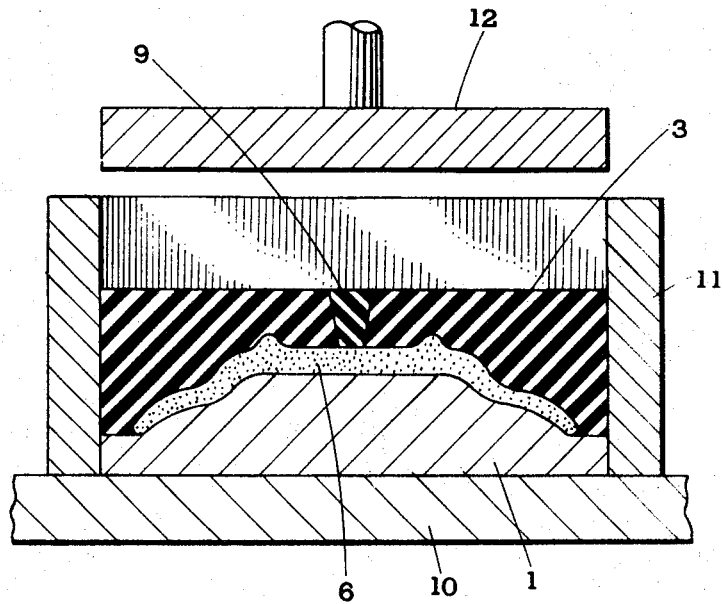
FIG. 3 is a sectional elevation schematically illustrating how mechanical pressure is applied to achieve the compressive force during the molding operation; and FOGS. 4—6 respectively illustrates schematically various apparatus for applying the compressive molding force by way of a suitable fluid which is under pressure.

According to the embodiment of the invention which is illustrated in FIG. 3, the means for urging the mold members one toward the other is shown as having a mechanical form and applies a mechanical pressure to the flexible mold member. In this case the restraining means takes the form of a confining structure to prevent outward expansion of the rubber mold member 3 during the application of the mechanical compressing force thereto. Thus, as may be seen from FIG. 3, after the mold cavity has been filled with the charge 6, the mold 1,3 is situated within the pressuretight vessel 11 which rests upon a suitable anvil 10, and then the required mechanical pressure is applied by means of an upper plunger 12 which slides along the inner side surface of the confining structure 11 and engages the flat top surface of the mold member 3 in the example of FIG. 3. Thus, the entire top surface of the mold member 3 is confined beneath the plunger 12 and cannot expand upwardly around the plunger 12 while the confining wall 11 prevents radial expansion of the rubber mold member 3 during the compression thereof, and thus the rubber which forms the mold member 3 in the embodiment of FIG. 3 is substantially noncompressible and very efficiently transmits the force in a direction which is only parallel to the central vertical axis of the mold, so that radial forces are excluded by the restraining means 11 of FIG. 3. Thus, with this construction outward expansion of the rubber mold member 3 is reliably prevented by the wall 11 of the pressuretight vessel, and thus the upper surface of the charge 6 is very efficiently acted upon without any possibility of radial shrinkage or expansion forces being directed thereto. When the pressure applied by way of the plunger 12 is eliminated, the rubber mold member 3 automatically restores itself to its original configuration due to its own resiliency, and the molded charge adheres to the upper surface of the metal mold member and will provide a molded article of uniform density.

Figure 4:
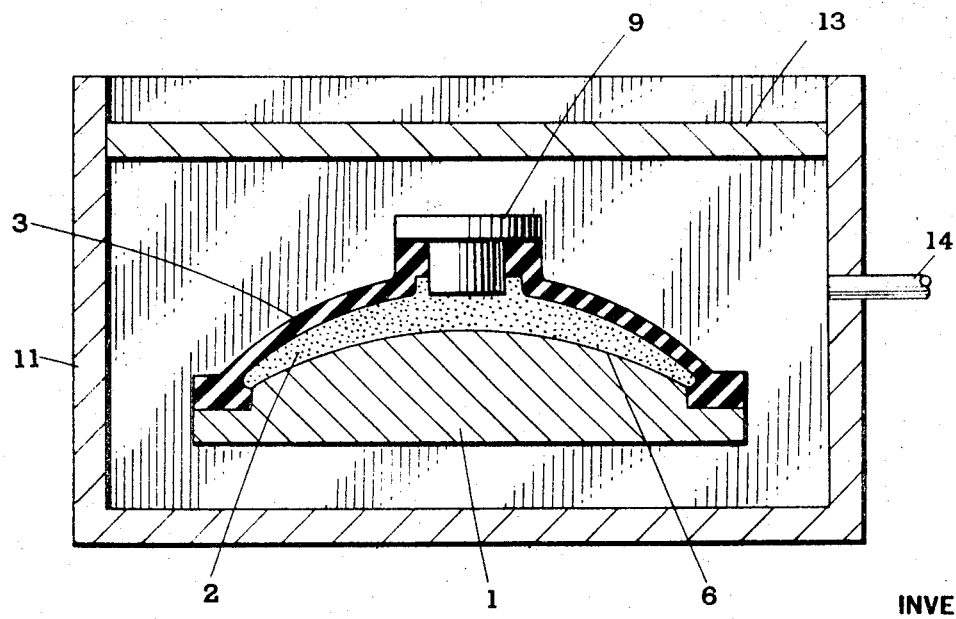
Figure 6:
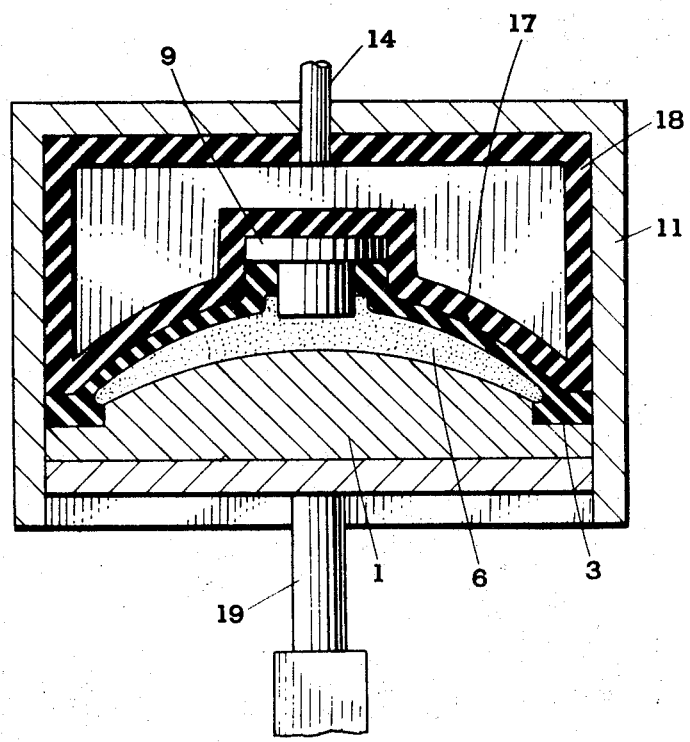
Figure 5:
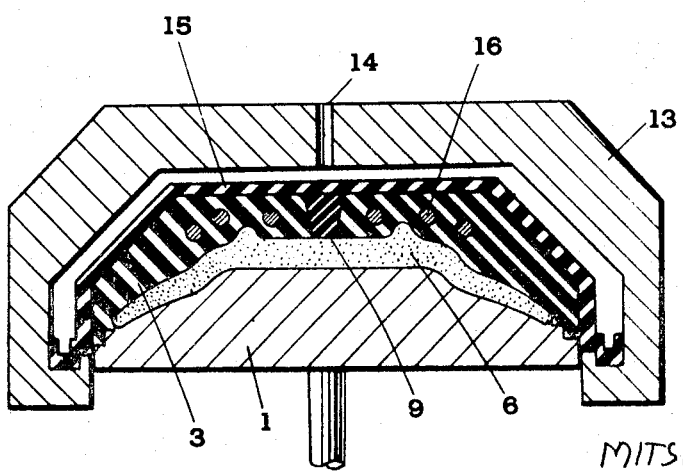

FIGS. 4—6 illustrate embodiments where the urging of the mold members, one toward the other, is derived by way of fluid pressure instead of mechanically. This fluid pressure is applied isostatically in all of the embodiments of FIGS. 4—6, and the fluid pressure again is directed to the rubber mold member to urge the latter toward the substantially rigid mold member 1.

Referring to FIG. 4, the high-pressure vessel 11 is made of a structural material which is capable of withstanding the liquid pressure within the vessel. The mold 1,3, after it has been charged in the manner described above, and closed, is situated within the vessel 11 in the manner shown in FIG. 4 and is supported therein in any suitable way. Then the top of the vessel is closed by a cover 13, and now the interior of the vessel is closed off fluidtightly from the exterior thereof. At this time a pressurized liquid such as oil under pressure is introduced into the vessel through the inlet 14. The oil which enters into the vessel acts solely upon the rubber mold member 3 to compress the charge 6 against the substantially rigid mold member 1. When the molding pressure is terminated, the cover 13 is removed from the vessel and the mold is then removed from the interior of the vessel 11. Thereafter the rubber mold member 3 is removed from the metal mold member 1, so that the molded article can be taken out of the mold.

Inasmuch as the direct application of liquid under pressure to the rubber mold member 3 of FIG. 4 may involve certain difficulties, the embodiment shown in FIG. 5 involves applying the compressive pressure to the rubber mold member 3 through a flexible sheet 15 which is itself in the form of a rubber member. This rubber, pressure-transmitting sheet member 15 of FIG. 5 forms a flexible wall of an enclosure in which the pressurized liquid is sealed, so that the pressure of the liquid is transmitted to the rubber mold member 3 without any engagement between the rubber mold member 3 and the liquid. The pressure-transmitting sheet member 15 is preferably made of a rubber sheet which is of a minimum thickness consistent with retaining in the sheet the mechanical strength required to transmit the required pressure. The sheet member 15 forms the lower wall of a pressure vessel 13 which otherwise has rigid walls and which is formed with the inlet 14 through which the liquid under pressure is introduced. The lower portion of the vessel 13 of FIG. 5 is formed with an opening through which the mold 1,3 can be introduced in an upward direction so that the upper surface of the flexible mold member 3 is engaged by the relatively thin, pressure-transmitting rubber sheet 15. In order to maintain the mold 1,3 in the position indicated schematically in FIG. 5 during application of the molding pressure to the charge 6, the metal mold member 1 is firmly held connected with the vessel 13 as by suitable screws, bayonet joint elements, or the like, so that the metal mold member 1 remains firmly clamped to the high-pressure vessel 13 during the application of the molding pressure to the charge 6 which is of course pressed against the upper surface of the metal mold member 1, as pointed out above. If desired any mechanical force or liquid pressure may be applied to the underside of the mold member 1 with the embodiment of FIG. 5 with a force sufficient to withstand the compressive force applied through the sheet member 15.

As was indicated above, it is important to prevent radial contraction of the rubber mold member 3, so as also to prevent radial expansion thereof back to its initial configuration when the compressive force is reduced. For this purpose a restraining means is provided, and the restraining means 11 of FIG. 3 was described above. In the embodiment of FIG. 5 the restraining means takes the form of a restraining body 16 embedded directly within the rubber mold member 3, this body 16 taking the form of a substantially rigid reinforcing core embedded directly within the mold member 3, as indicated in FIG. 5 so as to prevent damaging of the molded article when the rubber mold member restores itself to its initial configuration upon removal of the molding pressure. The restraining means 16 may take the form of suitable circular metal rings which are coaxial with each other and which are embedded within the body 3 in the manner indicated in FIG. 5 with the common center of the rings which form the core 16 coinciding with the central axis of the mold, so that the series of reinforcing rings 16 will not only reinforce the member 3 but will in addition prevent radial expansion and contraction thereof.

In the embodiment of the invention which is schematically illustrated in FIG. 6, the pressure is applied to the rubber mold member 3 through a flexible, resilient, high-pressure rubber bag or enclosure 18 having a lower surface 17 which conforms to and snugly engages the exterior upper surface of the mold member 3. This flexible enclosure 18 is situated within the high-pressure vessel 11 and the mold 1,3, after it has been charged in the manner described above, is introduced into the vessel 11 from the underside thereof so that the upper surface of the mold member 3 engages the lower surface 17 of the enclosure 18. Then a jack 19 is applied against the lower surface of the rigid mold member 1 urging the latter and mold member 3 is urged in this way against the surface 17. Then oil at high pressure is introduced into the enclosure 18 through the inlet 14, and this pressure acts indirectly on the rubber mold member 3 through the surface 17 of the enclosure 18 so as to compress the charge 6 which is situated within the mold cavity. As is apparent from FIG. 6 the enclosure 18 is confined at its entire exterior surface, by the vessel 11, except at the downwardly directed surface 17, so that all of the force of the fluid within the enclosure 18 will act to press the surface 17 toward the mold member 3 and will not be dissipated in expansion of the container 18 in a direction other than that which urges the surface 17 downwardly, as viewed in FIG. 6. Thus, the action of a liquid such as oil under high pressure within the enclosure 18 will be directed to the rubber mold member 3 to compress the latter against the charge 6.

After the charge has been compressed and molded in this way, the pressure within the rubber enclosure 18 is relieved and then the mold 1,3 is removed from the vessel 11 so that thereafter these mold members 1 and 3 can be separated from each other to permit the molded article to be removed from the mold.

While in all of the above examples the charge is shown directly engaging the metal mold member 1 and the rubber mold member 3, it is to be understood that the charge can be coated with a layer of a suitable material situated between the mold member 1 and the charge and/or between the mold member 3 and the charge. For example rubber, synthetic resins, metal foil, and the like, can be situated between the charge and the mold member 1 and/or the mold member 3, so as to achieve desirable effects in the final article.

As was indicated above, FIG. 3 shows a restraining means formed by the vessel 11 to restrain the mold member 3 against radial expansion and contraction, while FIG. 5 shows a restraining means which takes the form of the reinforcing core 16 embedded within the mold member 3.

The remaining embodiments of the mold member illustrated in the drawings also include a restraining means. It will be noted that in all of the remaining embodiments the mold member 3 has the configuration shown in FIGS. 1 and 2 so that the mold member has at its central and peripheral portions a thickness substantially greater than at adjoining portions of the mold member 3 which are located next to the relatively thick central and peripheral portions thereof. As a result of this variation in the thickness and tapering of the wall of the mold member 3, these relatively thicker portions thereof form a restraining means for this embodiment. Thus, because the central and peripheral portions of the mold member 3 of FIGS. 1,2,4 and 6 are substantially thicker than the adjoining portions of the mold member, when the compressive exterior force is applied by the fluid under pressure, the material of the thicker central portion of the mold member 3 tends to displace itself radially outwardly into the adjoining thinner portion of the mold member 3, while at the same time the material at the thicker peripheral portion of the mold member 3 tends to displace itself radially inwardly into the adjoining thinner portion of the mold member 3. The result is that there are at the central and peripheral regions of the mold member 3 radial forces directed outwardly from the central region and inwardly from the peripheral region, so that these forces balance each other and cancel each other out thus eliminating any tendency for the mold member 3 to undergo the undesirable radial expansion or contraction. Therefore, with the restraining means of this embodiment the charge 6 will also be acted upon only with forces extending parallel to the central axis of the mold, thus avoiding any damage which might occur from radial expansion or contraction of the elastic mold member 3.

It is apparent, therefore, that in accordance with the present invention the charge of substantially dry powder, which is charged in the mold cavity, is compressed by way of the flexible mold member so that the internal density of the molded articles is rendered highly uniform, thus eliminating any cracking due to stress which takes place during firing of the molded charge. In addition, by using the elastic, rubber mold member 3 it becomes possible to mold, in a highly satisfactory manner, configurations which would otherwise be extremely difficult to mold with conventional press-operated metal mold members.

Because the charge which is used, in accordance with the invention, is in the form of a substantially dry powder, strains and deformations which would be inevitable during the drying step as used in conventional wet methods are reliably eliminated. Furthermore, it is possible with the invention not only to greatly decrease the time required for carrying out the method, but also it is possible to decrease the firing temperature required in the manufacture of unglazed pottery. Also, with the invention the environment in which the operations take place is greatly improved. Inasmuch as it is not necessary to use with the invention large quantities of clay in the raw materials, the transparency and light-transmitting property of the ceramic articles are greatly improved.

In conventional apparatus, where the so-called casting or potter's wheel molding are carried out, it is essential to use large quantities of clay. The composition of material conventionally used is, ordinarily, in most cases 28 percent kaolin, 20 percent clay, 32 percent feldspar, and 20 percent silica, this composition containing a total of 0.44 percent iron (Fe). Because of the relatively large amount of iron (Fe) compounds in the clay, the coloring of the ceramic article is undesirably influenced after the firing thereof.

If, according to the invention, the above conventional composition is replaced by one where the amount of 20 percent of clay is replaced by 20 percent kaolin, and where the clay of this composition of the invention has only 1.5 percent of $Fe_2O_3$, then it is possible to increase the transparency of the final articles because of the decrease of (Fe) in the raw materials by 0.20 percent as compared to the above example. This composition of the invention is as follows:

EXAMPLE 1

| Kaolin | 48% (fe) | containing a total of 0.24% |
|---|---|---|
| Clay | 0% | |
| Feldspar | 32% | |
| Silica | 20% | |

In the case of manufacturing bone china, it is possible to mold with the invention compositions including the components of the following example in the ranges indicated therein:

EXAMPLE 2

| | |
|---|---|
| Kaolin | 25—40% |
| Bone Ash | 20—60% |
| Feldspar | 8—22% |
| Silica | 9—20% |

Thus, in accordance with the present invention it is possible to mold various materials which have the ratios of their components varied along the lines indicated above.

In accordance with the invention it is unnecessary to add plasticity to the clay, as indicated by the immediately preceding example, so that it was possible to achieve various materials, for molding, which have wide variations in the ratio of the components thereof as a result of the method of the invention which differs primarily from the conventional casting or potter's wheel methods.

As has been indicated above, the charge 6 of powder is substantially dry. Thus, in accordance with the invention the moisture content of the charge is less than 2 percent by weight thereof, and the invention has already been practiced commercially using a dry powder charge containing only about 1 percent of moisture, this charge forming the raw material introduced into the mold so as to be subsequently molded and then fired into the desired tableware articles.

The invention has already been used in making articles such as platters of a diameter of 12—16 inches, dinner sets having dishes of a diameter of 10½ inches and having tea saucers and tea cups. Also, the invention has been used in the molding of a melting pot of alumina or magnesia as a special porcelain.

In practicing the invention the molding pressure ranges between 3,000 and 10,000 p.s.i., and the charge was compressed to half its initial thickness. The time required for molding the articles was controlled according to the power or magnitude of the pressure, and ordinarily it was possible to complete the application of the molding pressure and to relieve it within a period of 5—10 seconds.

It is therefore apparent that with the apparatus of the present invention it becomes possible to mold ceramic articles in a highly superior manner and at relatively low cost to achieve articles of very high quality.

I claim:

1. For use in the manufacture of ceramic articles, a mold having a central axis and comprising a rigid mold member extending substantially perpendicularly across said axis and a flexible, elastic mold member also extending substantially perpendicularly across said central mold axis, said flexible and rigid mold members respectively having outer peripheries surrounding said axis and engaging each other and said mold members defining between themselves a mold cavity for receiving a charge which is to be molded, urging means coacting with at least one of said mold members for urging the latter toward the other of said mold members for compressing a charge in said cavity and molding the charge to a configuration determined by said mold members, and restraining means coacting with said flexible elastic mold member for restraining the latter from applying to the charge, during compression thereof, forces which extend radially with respect to said central axis, said restraining means coacting with said flexible elastic mold member during compression of a charge between said mold members for limiting said urging means to action upon the charge substantially exclusively with forces which extend parallel to said axis both during action of said urging means and when the action of the latter is terminated, said elastic mold member having an inherent resiliency sufficient for retracting itself from said charge without exerting any radial forces thereon upon termination of compression by said urging means, and said urging means coacting with said elastic mold member to release the latter for automatic retraction away from the charge due to the inherent resiliency of the elastic mold member upon termination of compression by said urging means, said restraining means including substantially central and peripheral regions of said elastic mold member which are substantially thicker than adjoining regions which respectively adjoin said central and peripheral regions and which are located therebetween, said urging means coacting with said restraining means for compressing said substantially thicker central and peripheral regions in a direction parallel to said axis to displace portions of said elastic mold member from said substantially thicker regions thereof to said adjoining regions in a manner tending to displace material of said elastic mold member outwardly from said substantially central thicker region thereof away from said axis and inwardly from substantially thicker peripheral region thereof toward said axis to provide in said elastic mold member radial forces which substantially balance each other during action of said urging means to prevent said elastic member from exerting radial forces on the charge.

2. For use in the manufacture of ceramic articles, a mold having a central axis and comprising a rigid mold member extending substantially perpendicularly across said axis and a flexible, elastic mold member also extending substantially perpendicularly across said central mold axis, said flexible and rigid mold members respectively having outer peripheries surrounding said axis and engaging each other and said mold members defining between themselves a mold cavity for receiving a charge which is to be molded, urging means coacting with at least one of said mold members for urging the latter toward the other of said mold members for compressing a charge in said cavity and molding the charge to a configuration determined by said mold members, and restraining means coacting with said flexible elastic mold member for restraining the latter from applying to the charge, during compression thereof, forces which extend radially with respect to said central axis, said restraining means coacting with said flexible elastic mold member during compression of a charge between said mold members for limiting said urging means to action upon the charge substantially exclusively with forces which extend parallel to said axis both during action of said urging means and when the action of the latter is terminated, said elastic mold member having an inherent resiliency sufficient for retracting itself from said charge without exerting any radial forces thereon upon termination of compression by said urging means, and said urging means coacting with said elastic mold member to release the latter for automatic retraction away from the charge due to the inherent resiliency of the elastic mold member upon termination of compression by said urging means, said urging means including a flexible wall engaging said elastic mold member at the exterior thereof and an enclosure part of which is formed by said flexible wall for receiving a fluid under pressure to act through said flexible wall on said elastic mold member to apply the compressive force therethrough to the charge.